July 22, 1941.  F. J. SMITH  2,249,986
MANUFACTURE OF GLYCOLS
Filed June 25, 1938
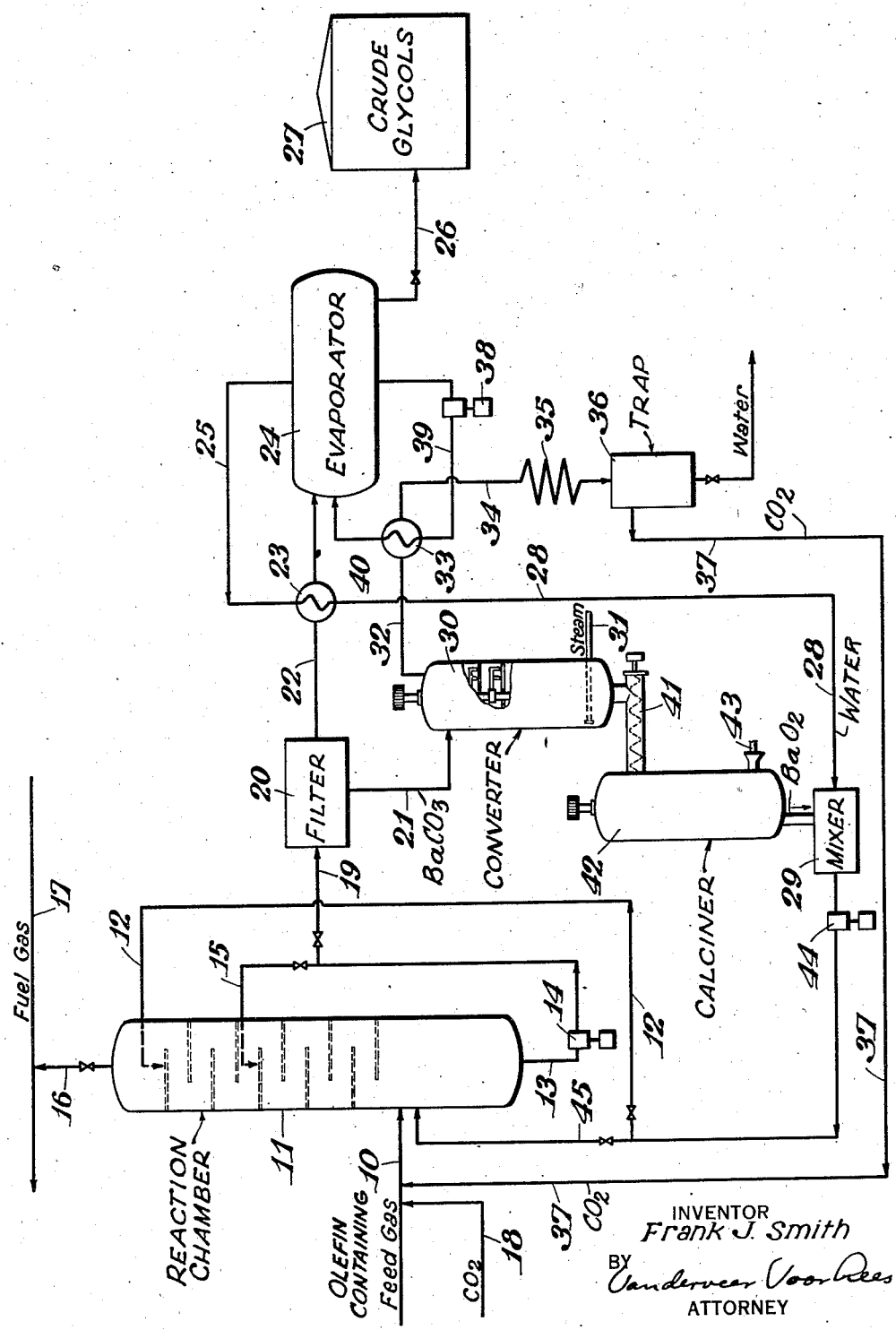
INVENTOR
*Frank J. Smith*
BY
*Vanderveer VoorHees*
ATTORNEY Patented July 22, 1941

2,249,986

UNITED STATES PATENT OFFICE 2,249,986

MANUFACTURE OF GLYCOLS

Frank J. Smith, Baltimore, Md., assignor to Standard Oil Company, Chicago, Ill., a corporation of Indiana Application June 25, 1938, Serial No. 215,744

7 Claims. (Cl. 260—635)

This invention relates to a process of making alcohols and more particularly the dihydroxy alcohols known as glycols. One object of the invention is to make ethylene, propylene or butylene glycols alone or in mixtures by the treatment of olefin hydrocarbon gases. Another object of the invention is to prepare glycols substantially free from halogen compounds. Still another object of the invention is to prepare glycols from hydrocarbon gas mixtures containing a large proportion of the non-olefinic gases such as methane, ethane, propane and butane. Still another object of the process is to make valuable glycols from low-priced fuel gases and particularly cracking still gases by treatment with barium peroxide in such manner that substantially no chemicals are destroyed in the process but are continually recycled for repeated use. Further objects of the invention will be apparent from the following description. The process is illustrated by a drawing which shows diagrammatically one form of apparatus and material routing for carrying out the process.

Referring to the drawing, hydrocarbon gases which may be derived from the cracking of petroleum oils, from the conversion of carbon monoxide and hydrogen into motor fuels by the Fischer process, or from some other source of unsaturated gases, are introduced by line 10 into reaction chamber 11. The pressure employed in the reaction may suitably be atmospheric pressure or slightly higher pressure, e. g., 5 to 50 pounds per square inch, depending on the pressure of the gases available.

The gases are conducted upward through the tower 11 where they are contacted, by means of suitable baffles, with a downflowing solution of reagents hereinafter described. The solution may be introduced by line 12 and, if desired, it may be withdrawn from the base of the tower 11 by line 13 and recycled by pump 14 and line 15 back to the tower to increase the concentration of reaction products. The olefins contained in the gas are substantially converted into glycols and the residual gas escapes by line 16 to the fuel gas main 17.

The solution employed in reaction chamber 11 is comprised of barium peroxide partially dissolved and suspended in water. In order to bring about the reaction between barium peroxide and the olefins I introduce $CO_2$ by line 18, into the gas stream entering the tower. The $CO_2$ converts the barium peroxide into barium carbonate in the presence of the olefins, thereby producing in the case of ethylene the following reaction:

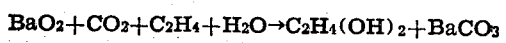

$$BaO_2 + CO_2 + C_2H_4 + H_2O \rightarrow C_2H_4(OH)_2 + BaCO_3$$

The barium carbonate which is formed remains suspended in the reagent solution and is recycled until the concentration of the desired glycol reaches an economical strength, for example 5 to 10%, or more. In fact, the glycol concentration may conveniently be built up to about 20% within reaction chamber 11.

When the glycol concentration has reached the desired value a portion of the solution is withdrawn from the system by line 19 leading to filter 20 where the suspended barium carbonate is removed by line 21. The filtered solution is then conducted by line 22 through heat exchanger 23 into evaporator 24 where substantially all of the water in the solution is removed by vapor line 25. If desired, evaporator 24 may be a multiple effect evaporator, operating under partial vacuum. The crude glycols obtained in evaporator 24 are withdrawn by line 26 to storage 27. The vapors are conducted by line 25 through exchanger 23 where the water is substantially condensed and led by line 28 to mixer 29 hereinafter described.

Barium carbonate in filter 20 is conducted by line 21 to converter 30 which is an insulated chamber suitably equipped with trays and agitators for drying the barium carbonate and subjecting it to high temperature whereby it is converted into barium oxide according to the following reaction:

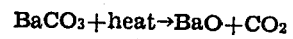

$$BaCO_3 + heat \rightarrow BaO + CO_2$$

This reaction is brought about by introducing superheated steam by line 31 and maintaining a temperature within converter 30 of about 800–1200° F. The steam and $CO_2$ are conducted by line 32 to heat exchanger 33 and thence by line 34 to condenser 35 where steam is condensed and separated in trap 36, the $CO_2$ being conducted by line 37 back to the hydrocarbon stream entering reaction chamber 11. Heat abstracted from the spent steam in exchanger 33 is employed to evaporator 24 by circulating liquid from the evaporator with pump 38 through exchanger 33 by lines 39 and 40.

The barium oxide is withdrawn from the base of converter 30 and conducted by conveyor 41 to calciner 42 wherein the barium oxide is agitated and heated at a temperature of about 850 to 1000° F. in the presence of excess air and preferably out of contact with combustion gases introduced by burner 43. The barium oxide is converted by this treatment into barium peroxide which is withdrawn into mixer 29 where it is first cooled and then mixed with water introduced by line 28. The resulting slurry of barium peroxide and water is forced by pump 44 through line 12 leading to the upper part of reaction chamber 11 or, if desired, it may be introduced by line 45 along with any $CO_2$ which it may contain into the lower section of reaction chamber 11.

The olefin gases which I may employ in my process may suitably contain about 20 to 50% of olefins and a gas containing about 30% of olefins is satisfactory. The gases may be withdrawn directly from the cracking still in which case they will contain methane, ethane and some hydrogen. If desired the cracking still gases may be separated into their components, for example the $C_2$, $C_3$ and $C_4$ fractions by a suitable condensing and fractionating system and the $C_2$, $C_3$ or $C_4$ fractions may be separately treated according to my process, thereby producing ethylene, propylene or butylene glycols as desired with relatively little contamination from other glycols or I may employ the gas mixture without separation and subsequently separate the glycols by suitable fractionation.

Although I have described my process with respect to a specific embodiment thereof, I do not intend that it be limited except as described in the following claims:

I claim:

1. The process of making glycols from olefin gases which comprises mixing said gases with carbon dioxide, contacting said gas mixture with a solution of barium peroxide whereby said olefins are converted into glycols and barium carbonate is formed, removing the barium carbonate from the glycol solution, converting the barium carbonate to barium oxide and then converting the barium oxide to barium peroxide and recycling said barium peroxide to said contacting step.

2. The process of claim 1 wherein the barium carbonate is converted into barium oxide by heating in the presence of superheated steam and carbon dioxide recovered therefrom is recycled to said contacting step.

3. The process according to claim 1 wherein the glycol solution, after removing barium carbonate, is evaporated and the water separated therefrom is recycled to said contacting step.

4. The process according to claim 1 wherein the glycol solution, after removing barium carbonate, is evaporated and the water is mixed with said recovered barium peroxide before recycling to said contacting step.

5. The process of making ethylene glycol from a mixture of cracking still gases which comprises condensing the $C_2$, $C_3$ and $C_4$ fraction of said gases, separating the $C_2$ fraction by fractional distillation, adding carbon dioxide to said $C_2$ fraction containing ethylene and introducing the resulting gas mixture into a reaction zone, contacting said gas mixture in said reaction zone with barium peroxide whereby said ethylene is converted into ethylene glycol and barium carbonate is formed, removing barium carbonate from the reaction products, converting the barium carbonate into barium peroxide and recycling said barium peroxide to said reaction zone.

6. The process of making glycols directly from olefin hydrocarbon gases which comprises mixing carbon dioxide with said olefin gases, contacting the resulting gas mixture with barium peroxide in the presence of water, whereby said barium peroxide is activated by said carbon dioxide in intimate association with said olefin gases, barium carbonate is formed and said olefin gases are converted into the corresponding glycols, separating barium carbonate from said reaction mixture and recovering said glycols from the remaining solution.

7. The process of claim 6 wherein the olefin employed is ethylene.

FRANK J. SMITH.